(12) United States Patent
Alberth, Jr. et al.

(10) Patent No.: US 8,179,102 B2
(45) Date of Patent: May 15, 2012

(54) DEVICES, SYSTEMS, AND METHODS FOR PRIORITY CHARGING OF A GROUP OF ELECTRONIC DEVICES

(75) Inventors: William P. Alberth, Jr., Prairie Grove, IL (US); Gjergji Gjermano, Palatine, IL (US); Patricia A. Robb, Prairie Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 634 days.

(21) Appl. No.: 11/765,515

(22) Filed: Jun. 20, 2007

(65) Prior Publication Data

US 2008/0315826 A1 Dec. 25, 2008

(51) Int. Cl.
*H02J 7/00* (2006.01)

(52) U.S. Cl. ......... 320/162; 320/103; 320/112; 320/114

(58) Field of Classification Search .................. 320/107, 320/108, 112, 114, 162
See application file for complete search history.

(56) References Cited

U.S. PATENT DOCUMENTS

| | | | | |
|---|---|---|---|---|
| 5,563,493 A * | 10/1996 | Matsuda et al. | ............... | 320/124 |
| 6,081,096 A * | 6/2000 | Barkat et al. | ............... | 320/124 |
| 6,222,347 B1 * | 4/2001 | Gong | ............... | 320/137 |
| 6,489,745 B1 * | 12/2002 | Koreis | ............... | 320/108 |
| 6,771,044 B1 | 8/2004 | Vinciguerra et al. | | |
| 6,803,744 B1 * | 10/2004 | Sabo | ............... | 320/108 |
| 2004/0268005 A1 * | 12/2004 | Dickie | ............... | 710/303 |
| 2006/0113955 A1 * | 6/2006 | Nunally | ............... | 320/108 |
| 2006/0160517 A1 * | 7/2006 | Yoon | ............... | 455/299 |
| 2008/0292917 A1 * | 11/2008 | Bimbaud | ............... | 429/13 |

FOREIGN PATENT DOCUMENTS

WO 2005036713 A1 4/2005

* cited by examiner

*Primary Examiner* — Arun Williams

(57) ABSTRACT

Disclosed are a device, system and method for multiple mobile communication devices that may be charged according to their relative priority and/or for multiple mobile communication devices that may be charged to a minimum level. The devices may be connected in any order physically, but based upon their relative charging priority the device with the highest priority may receive a charge first. The device with second highest priority may receive a charge second. Their relative priority may be communicated between the devices by wireless communication. In one embodiment, one or more devices may receive a minimum charge to allow operation, before the devices with the highest priorities are fully charged. In regions where electrical utility infrastructures are minimally developed users may share electrical facilities to recharge a plurality of mobile communication devices so that the devices with the highest priority of the grouped devices are fully charged first.

8 Claims, 5 Drawing Sheets

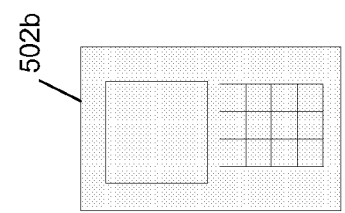
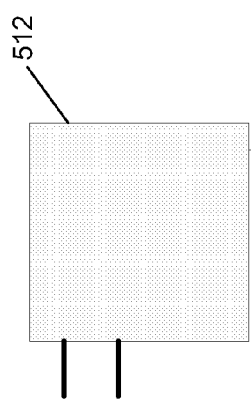
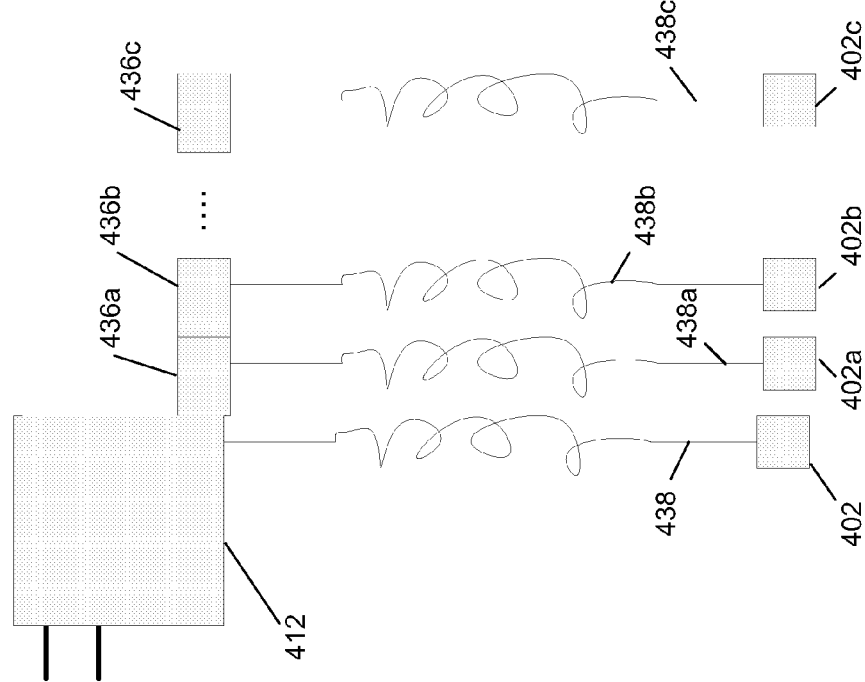
FIG. 5
FIG. 4

__ 
DEVICES, SYSTEMS, AND METHODS FOR PRIORITY CHARGING OF A GROUP OF ELECTRONIC DEVICES

FIELD

Described are devices, systems, and methods for charging of devices, and more particularly devices, systems, and methods for group charging of electronic devices where the devices determine priority for charging.

BACKGROUND

Mobile communication devices continue to gain popularity in emerging markets. Mobile communication systems have the advantage of less required infrastructure than hard-wired systems. Therefore, many emerging market regions are opting for the installation of mobile communication systems and their residents are becoming mobile communication subscribers. Moreover, oftentimes more than one family member will own a mobile communication device.

In many emerging market regions electrical utility infrastructures are minimally developed. In some cases, electricity is not provided to each customer twenty-four hours per day. Electricity may be provided for only a few hours per day, for example, during the middle of the night. In other cases, generators or other sources of electricity may provide electricity to residents of emerging market regions in limited amounts. Furthermore, in homes or businesses, electrical outlets may be few. Therefore, it may be difficult for residents of emerging market regions who share electrical facilities to recharge their mobile communication devices, particularly if there is more than one device in need of a charge at any given time.

BRIEF DESCRIPTION OF THE DRAWINGS

FIG. 4 depicts an embodiment similar to that shown in FIG. 2;

FIG. 5 depicts an embodiment similar to the embodiment shown in FIG. 3;

DETAILED DESCRIPTION

Disclosed are a device, system and method for multiple mobile communication devices that may be charged according to their relative priority and/or for multiple mobile communication devices that may be charged to a minimum level. Therefore, users in areas with and without reliable power availability may connect more than one mobile communication device to a single power outlet and the devices may charge in a priority order that may be determined by user preferences and/or may be predetermined. The devices may be connected in any order physically, but based upon their relative charging priority the device with the highest priority may receive a charge first. The device with second highest priority may receive a charge second. Their relative priority, for example, may be communicated between the devices by wireless communication. In one embodiment, one or more devices may receive a minimum charge to allow operation, before the device or devices with the highest priorities are fully charged. In this way, particularly those in emerging market regions where electrical utility infrastructures are minimally developed may share electrical facilities to recharge a plurality of mobile communication devices so that the device or devices with the highest priority of the grouped devices are fully charged first.

Figure 1:
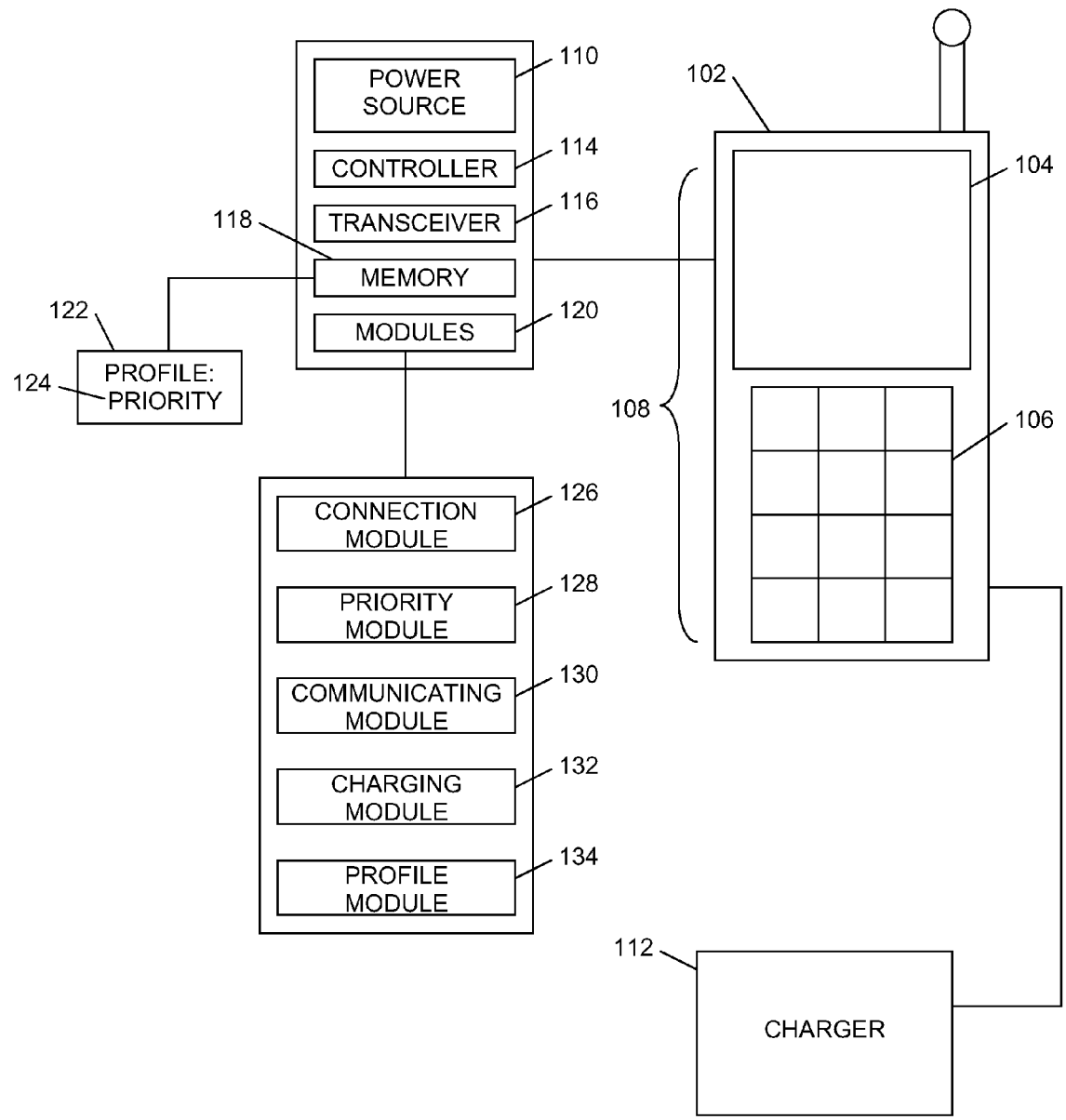
FIG. 1 shows according to an embodiment an electronic device configured to be connected to a charger.

FIG. 1 shows an electronic device 102 configured to be connected to a charger according to an embodiment. The device 102 may be for example a wireless electronic device such as a mobile communication device. The mobile communication device 102 may include user interface devices such as a display 104, and may in addition include a keypad 106. The user interface device or devices may be used to establish priority between devices based on user input. In another embodiment, the priority or relative priority may be established by pre-programming or downloaded programming. The display 104 and the keypad 106 may together make up a user interface 108. The user interface 108 may include other elements. For example, the display 104 may also include touch screen capability. The user interface may include. For example, soft keys. The mobile communication device may be configured to receive speech input via, for example, a microphone, and may be enabled to process speech input using voice recognition.

The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The device 102 includes a power source 110. The power source 110 typically includes one or more rechargeable cells. Upon recharging, the power source may hold any amount of charge. The amount of charge left on the power source before charging may be a variable or determining factor in establishing priority between devices. The electronic device may be configured to be connected to a charger 112 and to provide a charging current from the charger 112 to the power source 110. It is understood that the device may connect to the charger 112 via a contactless charging connection, for example, for inductive charging. It is in addition understood that the device may connect to the charger 112 via a wired connection.

The device 102 may further include a controller 114, a transceiver 116, a memory 118, and modules 120. The modules, for example, may include a connection module 126 configured to allow charging when the device is connected to a charger and a priority module 128 configured with instructions for determining by the first device 202 (see FIG. 2) and the second device 202' which of the first device and the second device has a higher priority for charging, and which of the first device and the second device has a lower priority for charging. The modules 120 may also include a communication module 130 configured with instructions for communicating wirelessly with the one or more additional devices, a charging module 132 configured to charge the device determined via the priority module 128 to have the higher priority before or at the same time as the device determined to have the lower priority, and a profile module 134 configured with instructions for entering a priority 124 for charging for the device.

The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

The controller 114 may be configured to be coupled to the power source 110 and to initiate charging of the power source when the electronic device 102 is connected to the charger 112. The transceiver 116 may be coupled to the controller and may provide for wireless communication with one or more additional wireless devices. The communication between the devices may include a variable or determining factor in establishing priority between devices.

In establishing the relative priority of one or more devices, the user interface 108 may be used to input data to the memory 118 that may include a profile 122 than can be configured to enable entering a priority 124 for charging the power source 110. That is, the priority 124 may be entered, for example via the user interface 108. Thus, the user interface 108 may provide for setting the priority 124 in the profile 122. In another embodiment, the priority 124 may be predetermined or preset at a factory or downloaded. The user interface 108 may provide for modifying the priority 124 after the priority has been entered, and/or may further provide for modifying a factory preset or downloaded priority.

As discussed above, the controller 114 may be configured to initiate charging of the power source 110 based on the stored priority as discussed above. The controller 114 may be configured to determine a priority for charging based on the priority 124 that has been entered, predetermined, or preset in the profile 120. The priority for charging determined by the controller 114 may further be based on a wireless communication transmitted to and/or received from another wireless communication device. Any number of factors or variables may control priority determination between devices. As mentioned above, the device 102 may include a transceiver 116 coupled to the controller 114. The transceiver may be a short range transceiver such a Bluetooth transceiver and may be configured to transmit and receive wireless communications, and may provide for such wireless communication with a second wireless device in establishing priority between devices.

Figure 2:
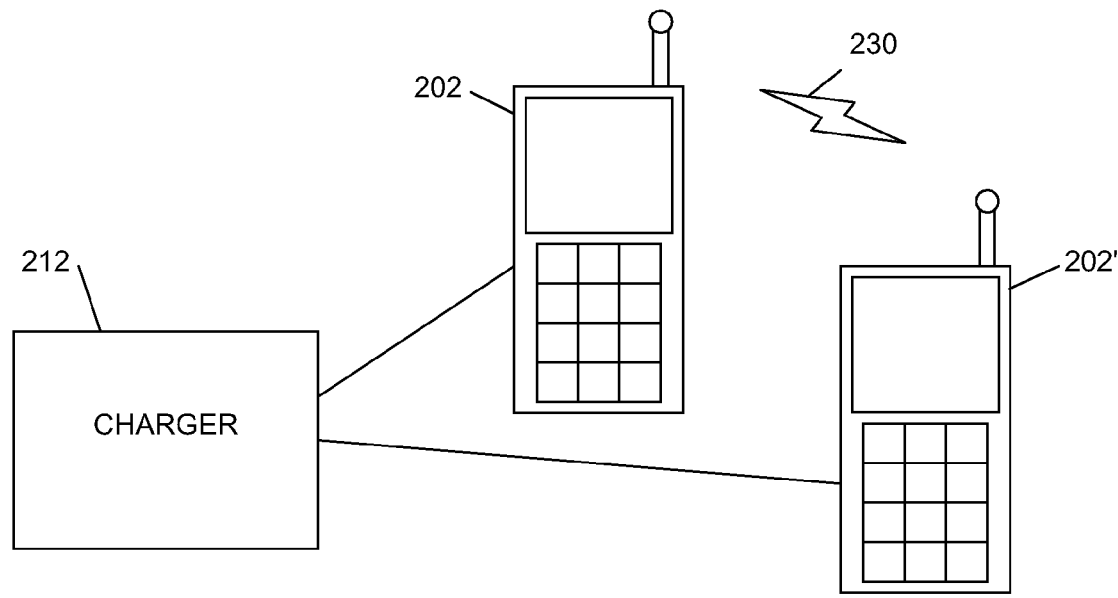
FIG. 2 shows the electronic device of FIG. 1 connected to a charger with a second wireless device connected to the charger.

FIG. 2 shows the wireless device 202 connected to a charger 212. It is understood that devices may be coupled, connected or in communication in any arrangement and/or order. A second wireless device 202' is also shown separately connected to the charger 212. Communication 230 between the two devices may be enabled by their respective transceivers, for the purpose of establishing relative priority for charging. Communication 230 could alternately be facilitated through the connections to the charger.

As mentioned above, the modules 120 (see FIG. 1) may include a priority module 128 configured with instructions for determining by the first device 202 and the second device 202' which of the first device and the second device has a higher priority for charging, and which of the first device and the second device has a lower priority for charging. The determination of relative priority for charging may be facilitated by wireless communication between the two devices. It is understood that when more than two devices are connected for charging, the determination of relative priority for charging may be facilitated by wireless communication among the more than two devices.

The embodiment of FIG. 2 depicts the device 202 connected to a charger with a second wireless device 202' connected to the charger 212. The charger 212 may include its own power source or may be connected to an external source of power, such as a vehicle battery or electric utility power. In this embodiment, the second wireless device 202' is separately connected to the charger 212. The charger may include provision for connection to more than two devices, as discussed below in connection with FIG. 4.

Wireless communication 230 may take place between the two devices via their respective transceivers. The first device 202 and the second device 202' may, by wireless communication, determine which of the two devices has the higher priority, and which has the lower priority. This can take place by, for example, each device transmitting a wireless communication to the other device. The wireless communication may contain information on the device's priority according to a predetermined protocol. For example, device priority may be given by a value on a numerical scale. As each device receives the information from the other device, each device may compare the other device's priority with its own priority. In this manner the first device 202 and the second device 202' may determine which has the higher priority, and which has the lower priority.

Communicating module 130 (see FIG. 1) and/or priority module 128 may include instructions to accomplish this determination. In a case where more than two devices are connected to the charger 212, communication may take place among the devices, and the highest priority device may be determined in a manner similar to that just described. Once priority has been determined by the two or more devices, charging current may be drawn by the devices according to a charging scheme, discussed below in connection with FIG. 6.

Figure 3:
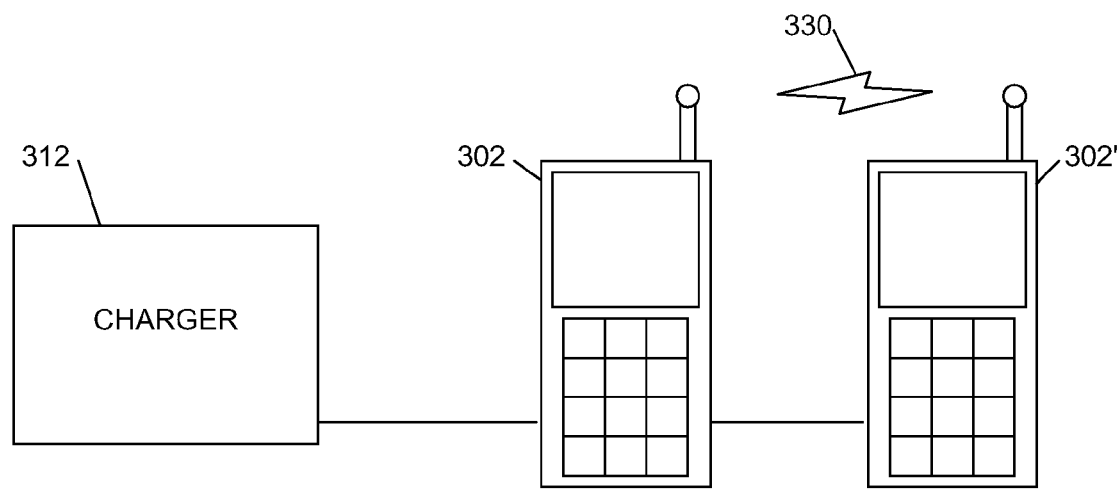
FIG. 3 shows the electronic device of FIG. 1 connected directly to a charger with a second wireless device connected to the charger via the first device.

FIG. 3 depicts a first device 302 connected to a charger 312. A second wireless device 302' is also shown. The device 302' is connected to the device 302 and may draw charging current from the charger 312 via the device 302.

As mentioned above, the modules 120 (see FIG. 1) may include a connection module 126 configured to allow charging when a device is connected to a charger. In an embodiment, a second device 302' can be connected to the device 302 as discussed above, and the connection module 126 may be configured to allow charging of the second device with charging current drawn from the charger 312 and passed through the device 302, considered as a first device. It is understood that the charger 312 need not include additional circuitry to enable charging by two or more devices according to priority. The charger serves as a source of charging current. The devices can draw up to a maximum current to be provided by charger, and may determine among themselves how to draw current from the charger according to the priority for charging of each connected device.

As previously discussed, the wireless device 302 may communicate via a wire or wirelessly via the transceiver 116 (see FIG. 1) with one or more additional devices. The modules 120 may include a communicating module 130 configured with instructions for communicating wirelessly with the one or more additional devices. The device 302 may accordingly communicate with the one or more additional devices when multiple devices are connected for charging, in order that priority for charging may be determined as previously mentioned. When relative priority for charging has been determined by the devices, charging of the devices may commence.

The modules 120 (see FIG. 1) may also include a charging module 132 configured to charge the device determined via the priority module 128 to have the higher priority before or at the same time as the device determined to have the lower priority. When more than two devices are connected to the charger for charging (see FIGS. 4 and 5), the device with second highest priority may receive a charge second. That is, the charging according to priority may continue, with devices drawing charging current according to their priority.

Each device may include a profile, as discussed above. The modules 120 (see FIG. 1) may include a profile module 134 configured with instructions for entering a priority 124 for charging for the device 302. The priority may be entered in a profile 122 as previously discussed.

The embodiment of FIG. 3 depicts in which the electronic device is shown connected directly to a charger with a second wireless device connected to the charger via the first device. The second wireless device 302' is shown connected to the device 302, as previously discussed. The first and second device may be configured so that the first device 302 may pass charging current through to the second device 302', and the second device may draw charging current from the charger 312 via the first device 302. Just as the first device is configured to pass charging current through to the second device, so too the second device may be configured to pass charging current through to a further device. In this way the charging system may include provision for connection to more than two devices, an aspect discussed below in connection with FIG. 5.

Wireless communication 330 may take place between the two devices via their respective transceivers. The first device 302 and the second device 302' may, by wireless communication, determine which of the two devices has the higher priority, and which has the lower priority. The determination of priority between the two devices has been discussed above.

Communicating module 130 (see FIG. 1) and/or priority module 128 may include instructions to accomplish this determination. As mentioned above, there may be a case where more than two devices are connected to the charger 312. In such case, communication may take place among the more than two devices, and the highest priority device may be determined in a manner similar to that just described. Once priority has been determined by the two or more devices, charging current may be drawn by the devices according to a charging scheme, discussed below in connection with FIG. 6.

It is understood that the embodiments shown in FIGS. 2 and 3 can have additional components suited for multiple additional devices. In some embodiments, the connectors that distribute charging current from the charger 112 (see FIG. 1) to one or more additional devices may be adapted for interconnection, or the charger itself may be configured to support multiple connections via, for example, multiple charging ports. In other embodiments, the one or more additional devices themselves may be adapted for interconnection. These embodiments are discussed next in connection with FIGS. 4 and 5. It is also understood that multiple devices could be connected by a combination of parallel (see FIG. 2) and serial (see FIG. 3) connections.

FIG. 4 depicts an embodiment similar to that shown in FIG. 2. In the embodiment of FIG. 4, the charger 412 may include an extra connector to accommodate an expansion cable. As shown, the device 402 is connected to the charger via a cable 438. Additional devices may be connected, for example, via daisy chained cables. In the figure, devices 402a, 402b, and 402c are shown connected via respective cables 438a, 438b, and 438c to their respective connectors 436a, 436b, and 436c. The dots in the figure indicate that additional connectors may be connected together, to provide connection to the charger 412 for additional devices. It is understood that the connectors 436a, 436b, and 436c may be, for example, daisy chained. For example, the connectors may snap together or otherwise interlock. Cables may be inexpensive and may provide benefit to consumers and manufacturers through reduced cost, compared to the cost of separate chargers for each device. As shown, connector 436a may be connected to the body of charger 412, connector 436b may be connected to connector 436a, and connector 436c may be connected to connector 436b. It is understood that the connectors may be connected together in another arrangement. For example, the charger may be configured with multiple locations at which to accept connectors. In another embodiment, the charger may provide just one connector, in which case daisy chained connectors may enable multiple connectivity for charging multiple devices.

FIG. 5 depicts an embodiment similar to the embodiment shown in FIG. 3. In the embodiment of FIG. 5, the charger 512 may connect to a single wireless device. As shown, the device 502 is connected to the charger via a cable 538. Additional devices may be connected via for example snap connectors, one device to another. That is to say, the devices may, by construction for example, snap together for charging. In the figure, devices 502a and 502b are shown connected to device 502. The dots in the figure indicate that additional devices may be connected together. As was discussed in connection with FIG. 3, the first device 502 and the second device 502a may be configured so that the first device 502 may pass charging current through to the second device 502a, and the second device may draw charging current from the charger 512 via the first device 502. Just as the first device 502 is configured to pass charging current through to the second device 502a, so too the second device 502a may be configured to pass charging current through to a further device, for example, 502b. It is understood that the connection from 502 to 502a could also be through contactless charging.

Although FIGS. 2, 3, 4, and 5 have been discussed principally in terms of devices such as mobile communication devices, such as the devices 202 and 202' (see FIG. 2) and the charger 212, the figures also describe embodiments of systems that may implement charging of two or more of any type of devices according to a relative priority for charging of each device.

As described above, devices may determine their relative priority for charging, and may charge their power sources according to the relative priority. That is, each device may draw a charging current from the charger, with the magnitude of the current drawn according to the priority of that device relative to the priority of other devices. Each device, though, may determine the magnitude of the current to draw, subject to the maximum current that may be supplied by the charger.

Figure 6:
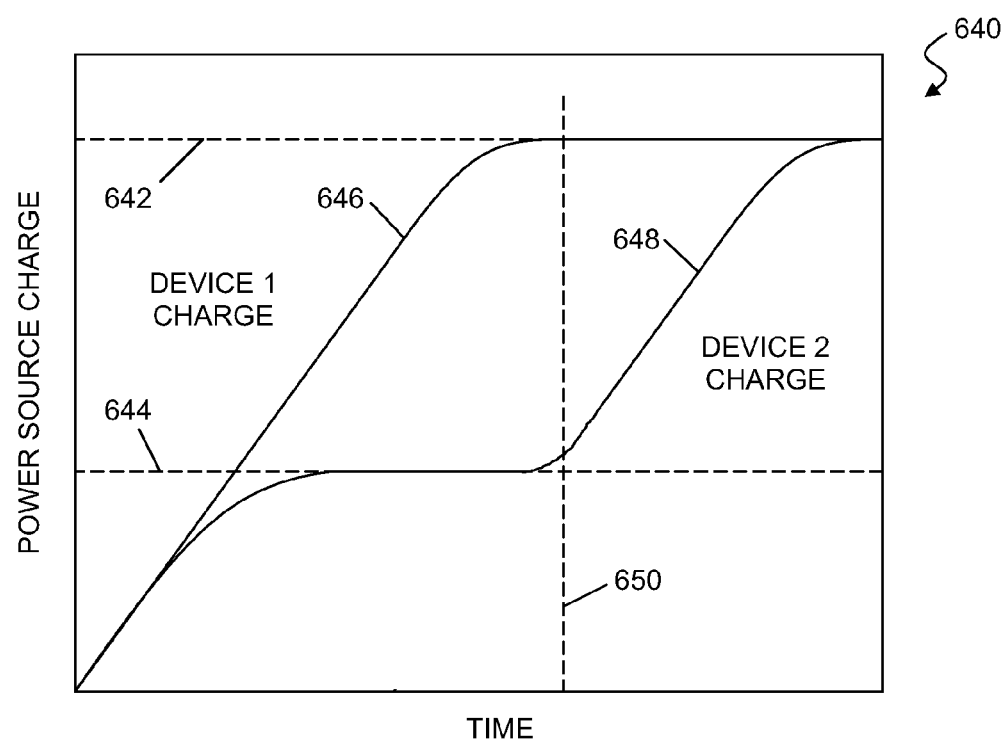
FIG. 6 illustrates according to an embodiment the charging of power sources based on priority.

FIG. 6 illustrates according to an embodiment the charging of power sources of devices based on priority. The plot 640 shows in a schematic way the change in power source charge as a function of time for a first device 202 (see FIG. 2) and a second device 202' both connected to the same charger. In the illustration of FIG. 6, a power source is fully charged when it attains a power source charge level as shown by the dashed line 642. In addition, there may be a threshold level as shown by the dashed line 644. In one embodiment, for example, one or more devices may receive a minimum charge to allow operation, before the devices with the highest priorities are fully charged. It is understood that a charging scheme may include additional incremental charging levels besides the threshold 644. Additional incremental charging levels are within the scope of this disclosure, as discussed below.

In the illustration, the first device 202 (see FIG. 2) has the higher priority for charging, and the second device 202' has the lower priority for charging. The plotted curve 646 represents the charge level for the power source of the first device 202. As shown schematically, it rises approximately linearly until nearly reaching a full charge level, then levels off. It is understood that the charging level of the power source for the first device need not rise approximately linearly, and that the depiction of FIG. 6 is schematic and for the purpose of illustration.

During a portion of the time the power source of the first device 202 (see FIG. 2) is charging, the power source of the second device 202' may be charging, shown by the curve 648. The power source of the second device 202' may charge at the same rate as the power source of the first device 202, until the charge of the second device's power source nearly reaches the threshold level 644. The charging rate of the second power source may then level off until the first power source reaches the full charge level 642. After that, the second power source may continue charging until it too reaches the full charge level 642.

In the embodiment depicted in FIG. 6, the first device charges at a particular charging rate until nearly charged to the level 642. The second device charges at the same charging rate as shown, until reaching the threshold 644. That is to say, in the embodiment shown, the charger is capable of charging the two devices each at the particular charging rate. In another embodiment, when both devices are drawing charging current, the charging current may be split between the two devices so that the power source of each device charges at a charging rate approximately half the particular charging rate. It is understood that other schemes for apportioning charging current from a charger may be employed without departing from the scope of the disclosure.

A scheme for apportioning charging in which devices may be charged for example overnight according to a charging priority for each device may benefit consumers in regions with minimally developed electrical utility infrastructures. Incremental charging may provide for example, that the mobile telephone belonging to the family breadwinner be charged first, so that it may be always available to the breadwinner. Additional mobile communication devices may acquire sufficient charge for, for example, paging or text messaging. Moreover, the other family members may be able to leave their devices connected to the charger while the breadwinner leaves for work. In these and other ways an incremental charging capability may provide benefit to electronic device users.

Incremental charging levels may also be considered as multiple thresholds for charging. As discussed above, a family breadwinner may first acquire a full charge level, since charging may take place according to priority for charging. Additional devices may first charge to a threshold level. In the context of incremental charging levels the threshold level may be considered as a first threshold. The first threshold may enable a minimal operational level for an additional device. Once all additional devices acquire a charge to the first threshold level, devices may continue to charge to a second threshold level, for example a level that may provide operability of a device for a particular length of time.

The charger 112 (see FIG. 1) may be powered by for example an electric utility grid, as previously discussed. Other sources of power may be available to provide power to a charger. For example, a charger may include solar cells, or may be configured to draw power from a vehicle battery. The charger 112 may be integrated into another electronic device.

Figure 7:
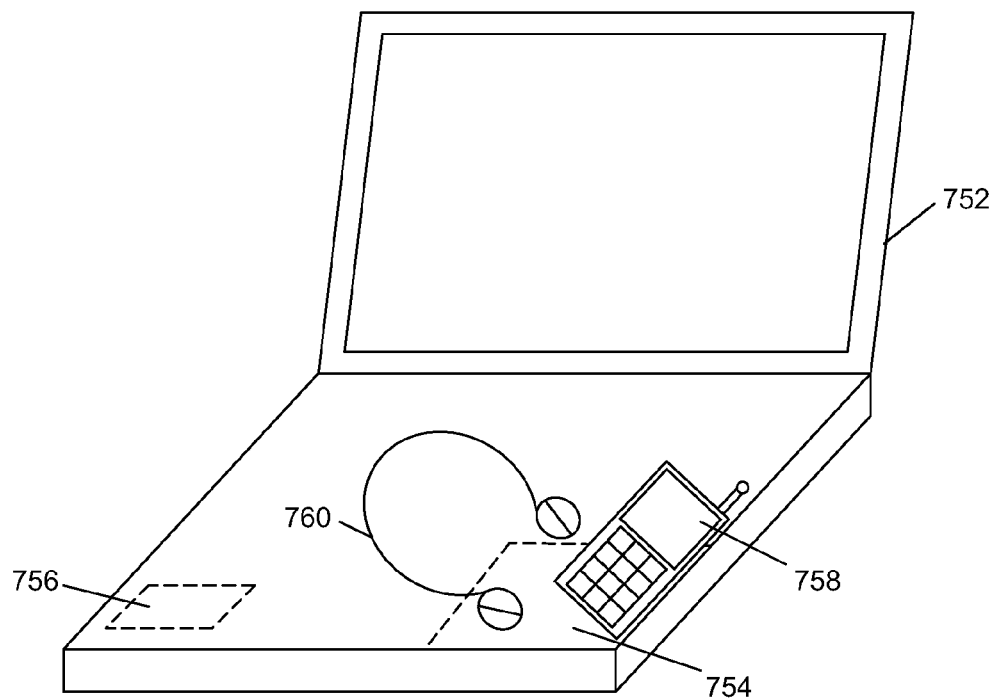
FIG. 7 shows an embodiment including a charger integrated into a laptop computer.

FIG. 7 shows an embodiment including a charger integrated into a laptop computer 752. The laptop computer 752 includes a charger 754. In an embodiment, the charger may be configured so that connection between the charger and devices to be charged may be contactless, for example via inductive charging. In another embodiment, the connection may be wired. It is understood that FIG. 7 in addition describes an embodiment of a system that may implement charging of two or more devices according to a relative priority for charging of each device.

The laptop computer 752 may include for example a fuel cell 756 or another power source to supply energy to the charger 754. As discussed above, two or more of any type of devices, the same or different, may be charged according to a relative priority for charging of each device.

For example, the laptop computer 752 may include solar cells, or a device to convert mechanical energy or energy from a compressed fluid, such as compressed air, into electricity for charging. In another embodiment a charger may be integrated into a device other than a laptop computer, such as a desktop computer or for example an appliance such as a vehicle mounted GPS navigational system.

The laptop computer 752 may provide the computing power to determine priority among devices connected to the charger 754 to be charged. In another embodiment, the computing power to determine priority may be provided by one or more of the devices to be charged. As shown, a mobile communication device 758 may be connected to the charger. Its profile 122 (see FIG. 1) may include a high priority 124 for charging. An accessory, such as for example, a Bluetooth headset 760, may also be connected to the charger. In an embodiment, the laptop computer may be configured to hold the first device 758 and the second device 760 in place positioned to connect to the contactless charger.

The accessory 760 may include a user interface 108 through which its priority for charging may be entered. In another embodiment, the charging priority for the headset may be preset at the factory. In yet another embodiment, the accessory may default to lowest priority for charging. In still another embodiment, incremental charging levels may provide for a first threshold for charging where the accessory may have a minimal operational level, then may continue charging to one or more additional threshold levels or incremental levels that may provide operability for particular lengths of time.

Figure 8:
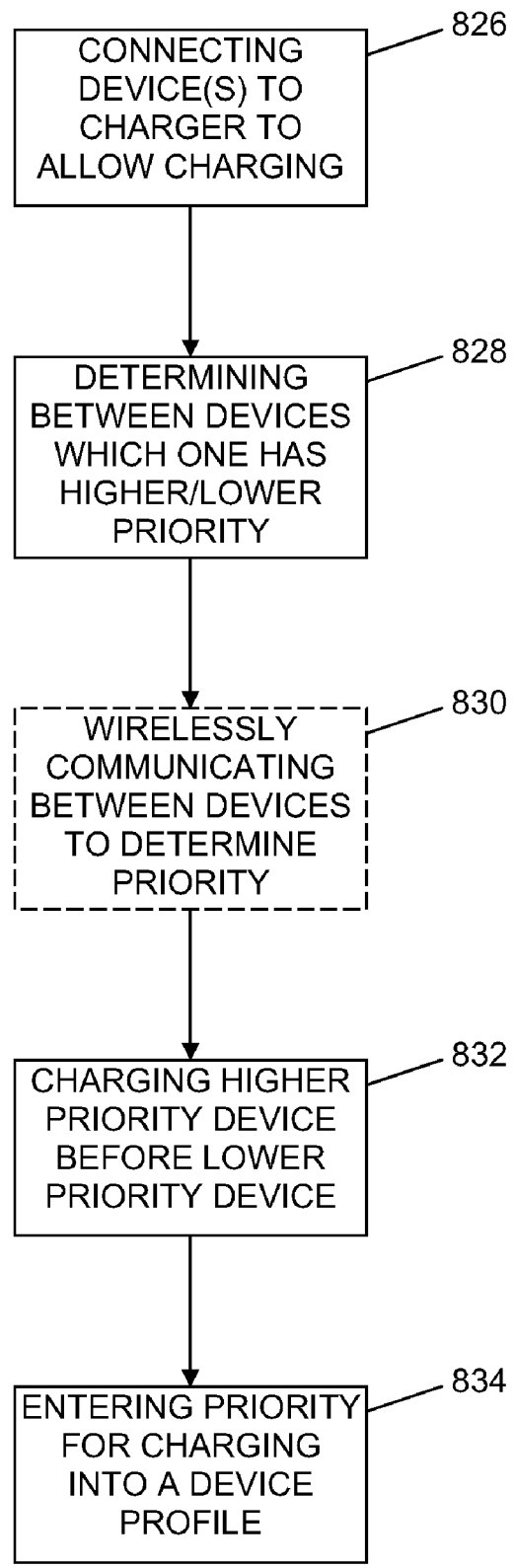
FIG. 8 shows a flowchart of an embodiment of a method for charging multiple power sources based on priority.

FIG. 8 shows a flowchart of a method, according to an embodiment, for charging multiple power sources based on priority. The method may include a step 826 of connecting two or more devices to a charger 112 (see FIG. 1) to allow charging. A connection module 126 may be configured to allow charging when the device 102 is connected to a charger. As previously discussed, the charger need not include additional circuitry. The connected devices determine how much charging current to draw, subject to the maximum charging current that can be provided by the charger. For example, a device k may draw current according to $$I_k = I_{max} \times p_k / \Sigma p_j$$

where $I_k$ is the charging current that may be drawn by device k, $I_{max}$ is the maximum charging current that can be provided by the charger, $p_k$ is the priority of device k, and $\Sigma p_j$ is the sum of priority taken over all devices connected for charging. Here the priorities $p_j$ may have positive, or at least nonnegative, values on a numerical scale. Because the devices may communicate wirelessly with one another, each device may ascertain the priority $p_j$ of each other device and so may evaluate the sum $\Sigma p_j$ in the expression above. It is understood that devices may draw current according to any appropriate charging scheme without departing from the scope of this disclosure. As has been previously discussed, multiple devices to be charged may connect separately to the charger. In another embodiment, the step 826 may include connecting a first device to the charger, and connecting a second device to the first device. The first device may be configured to provide to the second device a charging current from the charger.

Each of the connected devices may include a priority for charging. The priority for charging may be included in a profile 122 (see FIG. 1). In the method of FIG. 8, the connected devices determine between/among the devices which of the two or more devices has the higher priority for charging 828, in accordance with priority module 128 configured with instructions for determining by for example a first device 202 (see FIG. 2) and a second device 202' which of the first device and the second device has a higher priority for charging, and which of the first device and the second device has a lower priority for charging. For example, as just discussed, devices may ascertain the priority of other devices, where each device has a numerical value for its priority. In another embodiment, the priority may have for example a test value, such as HIGH, MEDIUM, and LOW, or the priority may be selected from another set of ordinal values. The determination of which of the connected devices may have the higher priority for charging may be facilitated by wireless communication between or among the devices 830, as previously discussed and in accordance with communication module 130 configured with instructions for communicating wirelessly with the one or more additional devices.

Once the relative priorities for charging have been determined, charging of the devices may commence 832 in accordance with charging module 132 (see FIG. 1) configured to charge the device determined via the priority module 128 to have the higher priority before or at the same time as the device determined to have the lower priority. Each device, for example, may include a charging regulator to regulate the current drawn by the device. The charging regulator may be coupled to the controller 114. As shown above in connection with FIG. 6, the higher priority device may be configured to achieve a full charge before the one or more lower priority devices.

Charging of the higher priority device may include simultaneous charging of the lower priority device until a threshold charge level is reached. That is, lower priority devices may be charged to a threshold level, and maintained there while the higher priority device fully charges. Charging of the lower priority device may be interrupted upon the lower priority device reaching the threshold level. The threshold level may be considered as a first threshold level. The method may include resuming charging of the lower priority device when the higher priority device becomes fully charged, or when the higher priority device reaches a second threshold level. As previously mentioned, there may be multiple incremental charging levels, according to multiple lower priority levels, for example.

Priority levels may be entered 834 into a device 102 (see FIG. 1) before connecting a device for charging, in accordance with profile module 134 configured with instructions for entering a priority 124 for charging for the device 102. A priority level may be entered into the device at any time, whether before connection for charging, during charging, or after completion of charging. A user interface 108 may be provided for such entry. In an embodiment with a laptop computer such as that shown in FIG. 7, the laptop computer may provide a user interface for entry of a charging priority for a device. In an embodiment a device may default to a lowest priority for charging unless its priority is specifically elevated via a user interface. In another embodiment a device may default to a highest priority for charging unless its priority is specifically elevated via a user interface. In this manner, devices which may lack a user interface may be charged in combination with other devices, according to the disclosed method, system, and devices.

As previously mentioned, in many emerging market regions electrical utility infrastructures are minimally developed, and electricity may not be provided to each customer twenty-four hours per day. Furthermore, in homes or businesses, electrical outlets may be few. Therefore, it may be difficult for residents of emerging market regions who share electrical facilities to recharge their mobile communication devices, particularly if there is more than one device in need of a charge at any given time. A scheme for apportioning charging in which devices may be charged for example overnight according to a charging priority for each device may benefit consumers in regions with minimally developed electrical utility infrastructures. The methods, systems, and devices described above may enable users in emerging market regions to recharge their devices, including mobile communication devices.

Incremental charging may provide for example, that the mobile telephone belonging to the family breadwinner be charged first, so that it may be always available to the breadwinner. Additional mobile communication devices may acquire sufficient charge for, for example, paging or text messaging. Moreover, the other family members may be able to leave their devices connected to the charger while the breadwinner leaves for work. In these and other ways an incremental charging capability may provide benefit to electronic device users.

Disclosed are a device, system and method for multiple mobile communication devices that may be charged according to their relative priority and/or for multiple mobile communication devices that may be charged to a minimum level. The devices may be connected in any order physically, but based upon their relative charging priority the device with the highest priority may receive a charge first. The device with second highest priority may receive a charge second. Their relative priority may be communicated between the devices by wireless communication. In one embodiment, one or more devices may receive a minimum charge to allow operation, before the devices with the highest priorities are fully charged. In this way, particularly those in emerging market regions where electrical utility infrastructures are minimally developed may share electrical facilities to recharge a plurality of mobile communication devices so that the devices with the highest priority of the grouped devices are fully charged first.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the appended claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, and all equivalents thereof, when interpreted in accordance with the breadth to which they are fairly, legally and equitably entitled.

We claim:

1. A system, comprising:
   a first device, comprising:
      a first rechargeable power source;
   a second device, comprising:
      a second rechargeable power source; and
   a laptop computer, comprising:
      a charger, wherein the charger is a contactless charger configured so that connection between the charger and the first and second devices to be charged is contactless;
   wherein:
      the first device is configured with a first charging priority and the second device is configured with a second charging priority;
      the first device and the second device are configured to be connected to the charger to allow charging;
      the laptop computer is configured to communicate wirelessly with the first device and the second device;
      at least one of the first device, the second device, or the laptop computer is configured to determine which of the first device and the second device has a higher priority for charging.

2. The system of claim 1, wherein:
   the charger connects to the first device;
   the second device connects to the first device; and
   the first device is configured to provide to the second device a charging current.

3. The system of claim 1, wherein:
   the first device and the second device are configured to communicate wirelessly; and
   the first device and the second device are configured to determine via wireless communication which device has the higher priority.

4. The system of claim 1,
   the first device further comprising a first user interface configured to enable entry of a priority for charging of the first device; and
   the second device further comprising a second user interface configured to enable entry of a priority for charging of the second device.

5. The system of claim 1, wherein the first device and the second device are further configured to determine which of the first device and the second device has a lower priority for charging.

6. The system of claim 5, wherein the device which is determined to have the higher priority is configured to charge before or at the same time as the device which is determined to have the lower priority.

7. The system of claim 5, wherein:
   the first and second device are configured to charge until their power sources are charged to a first threshold; and
   the lower priority device, upon reaching the first threshold, is configured to stop charging until the higher priority device is charged to a second threshold.

8. The system of claim 1, wherein the laptop computer is configured to hold the first device and the second device in place positioned to connect to the contactless charger.

* * * * *